Reed & Packard.
Eyeleting Machine.
No. 1730
Reissued Jul. 19, 1864
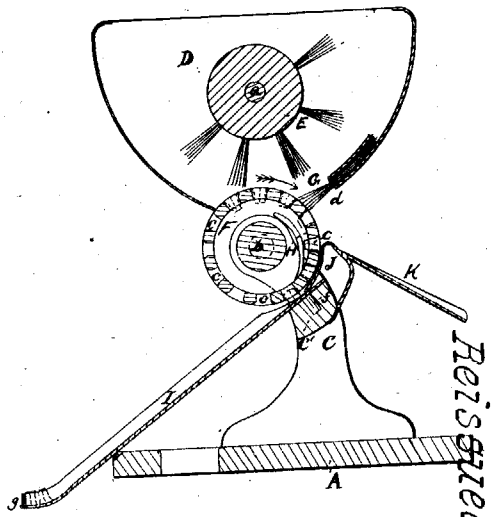
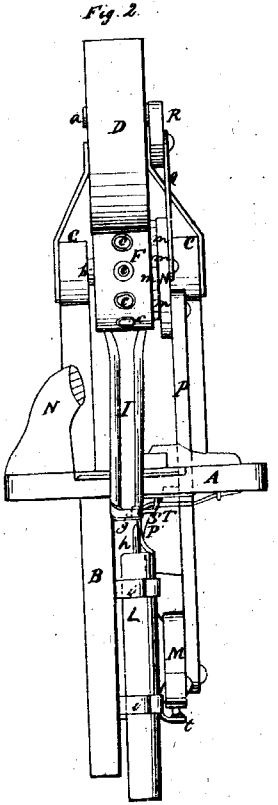
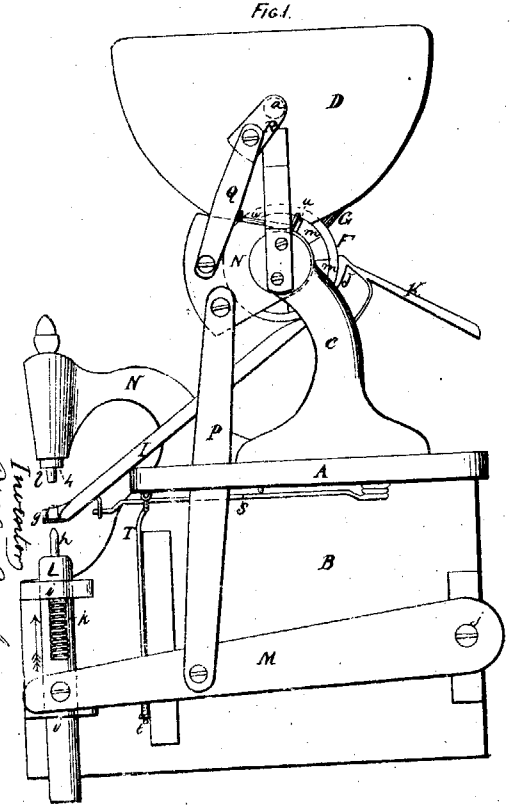
Witnesses
G. W. Coombs
G. W. Reed
Inventors
T. K. Reed
H. F. Packard
per Munn & Co.
attorneys

UNITED STATES PATENT OFFICE.

TIMOTHY K. REED AND CHARLES E. HOWARD, OF WEST BRIDGEWATER, MASSACHUSETTS, ASSIGNEES OF T. K. REED AND H. F. PACKARD.

IMPROVEMENT IN EYELET-MACHINES.

Specification forming part of Letters Patent No. 35,952, dated July 22, 1862; Reissue No. 1,730, dated July 19, 1864.

DIVISION No. 2.

*To all whom it may concern:*

Be it known that we, TIMOTHY K. REED and CHARLES E. HOWARD, of West Bridgewater, county of Plymouth, State of Massachusetts, are the sole owners of a patent granted to T. K. REED and H. F. PACKARD, July 22, 1862, for an Improved Eyelet-Machine; and we do hereby declare that the following is a full, clear, and exact description thereof, reference being had to the accompanying drawings, making a part of this specification, in which—

Figure 1 is a side view of the machine. Fig. 2 is a front view of the same with the stationary arm that carries the closing-punch in section. Fig. 3 is a vertical section of the feeding apparatus parallel with Fig. 1.

Similar letters of reference indicate corresponding parts in the three figures.

The object of our invention is to automatically feed eyelets up to the work of inserting and clinching, or riveting them into cloth or other material, thereby avoiding the necessity of handling each eyelet or inserting it by hand into the material.

To enable others skilled in the art to make and use our invention, we will describe its construction and operation.

A is a horizontal table supported by a suitable stand, B, and having erected upon it two standards, C C, on the top of which is the hopper D, having flat parallel sides and a semicircular or inverted arc-formed bottom. In the sides of the hopper are bearings for the shaft *a* of the oscillating brush E, which fits snugly between the said sides, and in the bottom of which there is an opening, through the interior of which works the upper part of the intermittently-rotating cylinder F, the horizontal shaft *b* of which works in bearings provided below the hopper in the standards C C. The cylinder F is hollow, and has provided in it a single row of holes, *c c*, arranged at equal distances apart all round, the said holes being countersunk for the reception of the flanges of the eyelets, and otherwise of such size and form that the eyelets will fit them loosely with their flanges outward, as shown in Fig. 3, in which the eyelets are shown in red color. The opening in the hopper through which the cylinder F works is elongated behind the cylinder, as shown at *d* in Fig. 3, and fitted with a stationary brush, G, the points of whose bristles touch the periphery of the cylinder, the object of such brush being to assist the oscillating brush in brushing the eyelets into the holes *c c* of the cylinder with the flanges upward. Within the cylinder there is arranged a stationary cam, H, secured to one of the standards C C, for the purpose of pushing out the eyelets from the holes as they are carried by the revolution of the cylinder below the axis thereof, and delivering them with the flange downward upon the inclined chute I. At the back of the cylinder and above the chute I there is fitted to the periphery of the cylinder a stationary curb, J, from the upper end of which there descends in a backward direction an inclined plane, K, down which any of the eyelets that may not have been properly placed in the holes *c c* will be discharged from the cylinder.

The chute I is attached at its upper end to a stationary cross-piece, C′, arranged between the standards C C by means of a pin, *f*, upon which it oscillates laterally. This chute has its sides formed for the reception of the flanges of the eyelets, to retain them with their flanges downward, as they slide freely down it by gravitation, and the lower portion of the said chute is horizontal and fitted with an elastic mouth-piece, *g*, to prevent the too free delivery of the eyelets on to the pin *h*, which is fitted to work up and down in a central bore in the upright bolster L. The lower horizontal portion of the chute I is open at the bottom for the entrance of the pin *h*, and in the side which is toward the spectator, in Fig. 1, for the delivery of the eyelets. The bolster L is fitted to have a vertical reciprocating movement in fixed guides *i i*, attached to the support B of the machine, such movement being produced by its connection with a vertically-operating lever, M, working on a fixed fulcrum, *j*, which attaches it to the support B. The pin *h*, which is of a size to fit the interior of the eyelets, has applied to it within the bolster L a spring, *k*, which tends to force it upward so that its point will protrude some distance through the top of the bolster.

N is the stationary arm which carries the upright fixed punch *l*, the point of which is of a size to enter the eyelets, and which has a concave shoulder of a form to turn over the upper edges of the eyelet and rivet it in the cloth or other material.

To produce the intermittingly-rotating movement of the cylinder F to deliver the eyelets into the chute I, the said cylinder is furnished at one end with a number of ratchet-teeth, *m m*, corresponding with the number of holes *c c* in the cylinder F, and its shaft *b* is fitted with a loose arm, N′, which carries a spring-pawl, *n*, and the said arm is connected by a rod, P, with the lever M. The downward movement of the lever produces a corresponding movement of the arm N′, which causes the pawl to move over one of the teeth *m m*, and the upward movement of the lever produces a corresponding movement of the arm N′ and causes the pawl to engage with a tooth, *m*, and turn the cylinder a suitable distance in the direction of the arrow shown near it in Fig. 3, to deliver a new eyelet into the chute. The connection of the arm N′ by a rod, Q, with an arm, R, on the shaft *a* of the brush E serves to produce the required oscillating movement of the said brush, whose points work in contact with the cylinder F. The lateral movement of the chute I is produced by the action of a wedge-like projection, P′, on the inner side of the rod P, and a spring or elastic rod, S, one end of which is connected with the said chute and the other end secured to the bottom of the table A, the said spring S exerting a constant tendency to press the chute toward the rod P and bring the mouth of the chute over the bolster L. Attached to the bottom of the table A there is an elbow-shaped spring, T, the upper part of which is so constructed and formed that it prevents the action of the spring S to bring the mouth of the chute over the bolster until the lever M has nearly completed its downward movement, when the said lever comes into action on a hook, *t*, at the bottom of said spring and presses down the said spring in such manner as to liberate the spring S and so permit it to throw the chute suddenly to a position over the bolster L.

The construction and individual operations of the several parts of the machine having now been described, we will proceed, in conclusion, to describe very briefly their combined operations to effect the eyeleting process. The operator stands in front of the machine holding the goods ready perforated for the reception of the eyelets and operating the lever M. The operations of the brushes E and G, assisted by the rotary motion of the cylinder F itself, cause the holes *c c* in the said cylinder to receive the eyelets with their flanges outward, and as the cylinder rotates and brings the eyelets between the cam H and the upper part of the chute I the eyelets are discharged one by one upon the chute, down which they slide by gravitation. The jerk which is given to the chute I by the liberation of the spring S when the lever M descends onto the hook *t* of the spring T causes the eyelet which has been near the mouth of the chute to force aside the spring mouth-piece *g* and arrive over the mouth, and as the bolster L rises with the lever M the pin *h* is caused to pass upward with the said bolster through the said eyelet and through the perforation in the goods, which is then placed by the operator over the said pin and the eyelet, and the continued ascent of the bolster causes it to lift up the eylet and the goods as the chute is moved aside by the action of the wedge P′ and to place the eyelet on the punch *l*. The further ascent of the pin *h* is prevented after its point comes in contact with the punch, and as the bolster completes its ascent it drives the upper edge of the eyelet against the shoulder 4 of the punch, and thereby causes it to be turned outward all round the punch and rivets the eyelet into the goods. As the bolster descends again the pin *h* is forced upward relatively to it by the spring *k*, and when the movement has ceased and the said pin has descended with the bolster the eyelet and the goods are removed from the punch.

Having thus described our invention, what we claim as new, and desire to secure by Letters Patent, is—

1. An eyeleting-machine which has an inclined chute, substantially as herein described, interposed between the supply-hopper and the eyelet, applying tools herein described, and above the under and below the upper of said tools and directly between the two, such machine feeding and applying the eyelets, substantially as set forth.

2. Depositing the eyelets successively upon a yielding pin, *h*, by means of an inclined chute, 1, and immediately after applying the eyelet to the article by means of two tools, L and *z*, substantially as and for the purpose set forth.

TIMOTHY K. REED.
CHARLES E. HOWARD.

Witnesses:
HENRY L. BRYANT,
A. J. HANSON.